Nov. 3, 1959  B. E. CURRAN  2,910,926
DUCT UNIT FOR AN AIR CONDITIONING SYSTEM
Filed Dec. 4, 1956  2 Sheets-Sheet 1
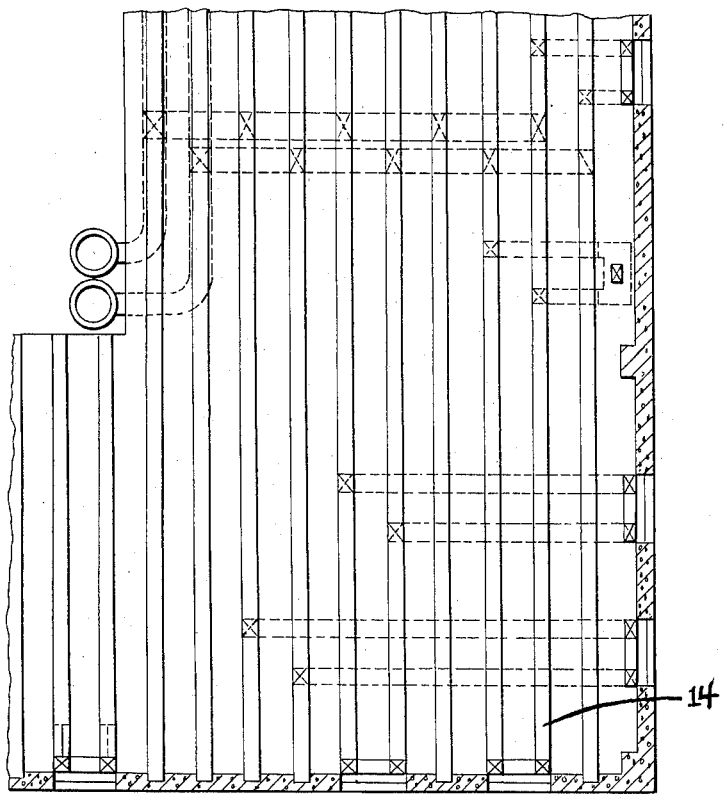
FIG. I
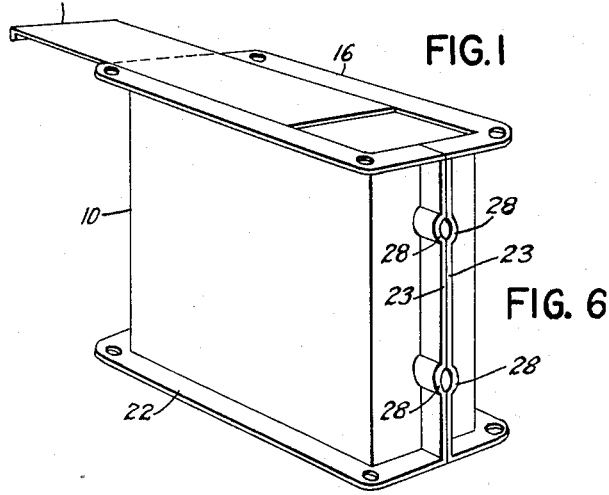
FIG. 6
INVENTOR.
Bernard E. Curran
BY Robert R. Churchill
ATTORNEY Nov. 3, 1959   B. E. CURRAN   2,910,926
DUCT UNIT FOR AN AIR CONDITIONING SYSTEM
Filed Dec. 4, 1956   2 Sheets-Sheet 2
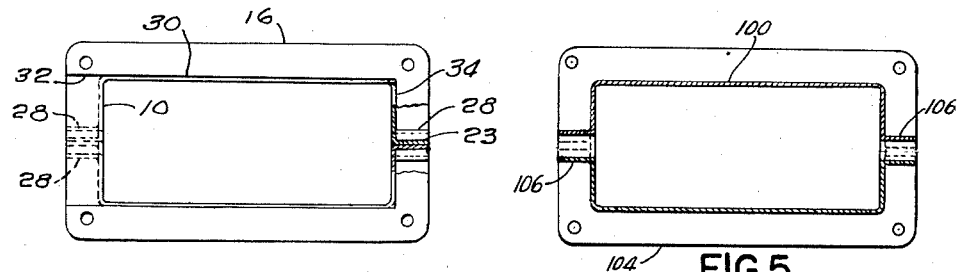
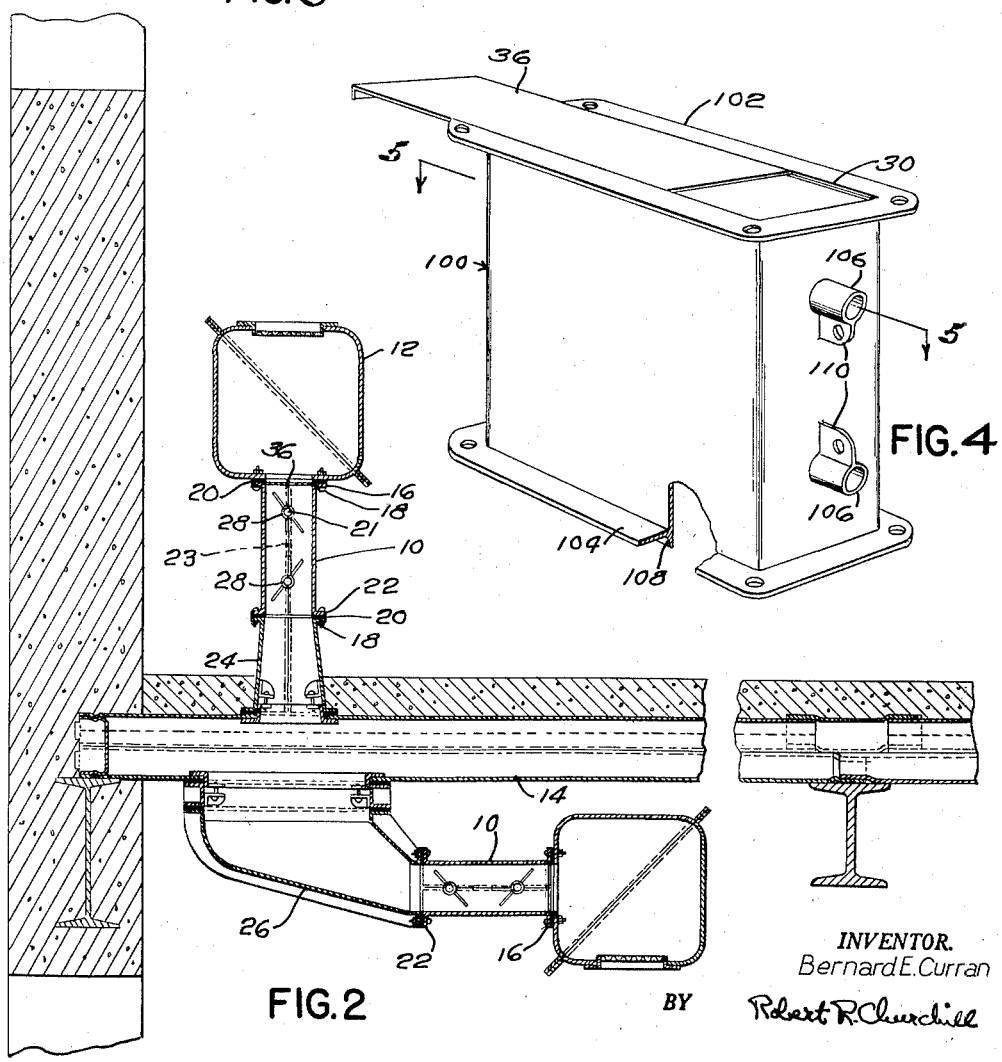
INVENTOR.
Bernard E. Curran
BY Robert R. Churchill
ATTORNEY United States Patent Office 2,910,926
Patented Nov. 3, 1959

2,910,926
DUCT UNIT FOR AN AIR CONDITIONING SYSTEM

Bernard E. Curran, Sewickley, Pa., assignor to H. H. Robertson Company, Pittsburgh, Pa., a corporation of Pennsylvania Application December 4, 1956, Serial No. 626,139

4 Claims. (Cl. 98—41)

This invention relates to a novel duct unit for use as a connecting duct in an air conditioning system.

The invention has for an object to provide a novel duct unit which may not only form a connecting duct for connecting a discharge outlet to an air supply duct but also enables a damper operating shaft for a damper disposed within the duct section to be conveniently journalled in bearings formed in opposed walls of the duct section.

With this general object in view and such others as may hereinafter appear, the invention consists in the duct unit hereinafter described and particularly defined in the claims at the end of this specification.

In the drawings:

Fig. 1 is a diagrammatic view of one portion of a multi-cellular floor forming a component of the building and air conditioning structure of the type illustrated in the Goemann Patent No. 2,729,429, dated January 3, 1956;

Fig. 2 is a vertical sectional view on the line 2—2 of Fig. 1 illustrating the embodiment of the present duct unit in the structure;

Fig. 3 is a detail plan view with a portion broken away of the duct unit shown in Fig. 2;

Fig. 4 is a perspective view of a modified form of the present duct unit;

Fig. 5 is a cross sectional view on the line 5—5 of Fig. 4; and

Fig. 6 is a perspective view of the duct unit shown in Figs. 2 and 3.

Referring now to the drawings, the duct connection comprises a unitary structure which is adapted to be used in forming a connection or a part of a duct connection from one of the air conducting cells such as 14 of the air conditioning system shown in the Goemann patent above referred to and illustrated in Figs. 1 and 2, and to an outlet box 12. The duct section 10 is preferably of the structure illustrated in Fig. 2 having a top flange 16 and a bottom flange 22 projecting outwardly from the top and bottom of the duct section and which are adapted to enable the duct section to be connected to the outlet box 12 and to other duct connecting units as will be described.

The present novel duct unit is designed for the reception of one or more operating dampers, preferably two operating dampers, for controlling the flow of air from the air carrying duct or cell 14 to the outlet box 12, and accordingly, each of two opposed walls of the duct section is provided with a short cylindrical bearing forming member adapted to receive the projecting portions of a damper operating shaft 21 to permit operation of the damper externally of the duct section. In practice in one embodiment of the invention it is preferred to construct the duct section by die casting the same in two half sections with the body portion of the duct and a half section of each of the top and bottom flanges 16, 22, together with cooperating connecting vertical flange portions 23 and two semicylindrical bearing forming members 28, as best shown in Fig. 6. The two half sections are assembled and connected together by welding the vertical flanges 23 to form an airtight joint between the two flanges 23. Each bearing forming portion 28 is aligned with a corresponding bearing forming portion on the opposite wall of the body of the duct section so as to permit a damper operating shaft to be journalled in the aligned bearing forming portions 28 and to thereby permit the operation of the damper externally of the duct unit. In some instances it is preferred to provide the duct section with a second set of aligned bearing members 28 so that a double set of dampers may be operatively supported within the duct section, as illustrated in Fig. 2.

As shown in Fig. 2, the duct section 10 may be secured to the bottom of the outer box 12 by bolts 18, a suitable gasket 20 being provided to insure an airtight connection. The lower flange 22 may be connected by bolts 18 to the upper flange of a second duct section 24 which is secured to the upper wall of the air carrying cell 14 to mount the entire assembly thereon. When it is desired to utilize the duct unit 10 in connection with the ceiling outlet box, a suitable elbow shaped duct fitting 26 is bolted in airtight relation to the lower flange 22 of the duct section and the parts are arranged as illustrated in Fig. 2.

As illustrated in Fig. 3, the upper surface of the die cast duct unit 10 may be provided with a grooved portion 30 extended across the flange 16 at one end, as indicated at 32, and terminating flush with the inner end of the flange at the other end as indicated at 34. When assembled, the grooved portion forms with the bottom wall of the outlet box 12 a slide opening for a manually operated slide damper indicated at 36 in Fig. 2.

In a modified form of duct section, as illustrated in Figs. 4 and 5, the duct section may comprise a unitary member which may be a single die cast piece having a body portion 100 provided with top and bottom flanges 102, 104 respectively, and having two aligned bearing portions 106, on each of opposed walls adapted to receive a damper shaft extended therethrough. The upper surface of the single die cast duct section may also be provided with a grooved portion 30 arranged to accommodate a slide damper 36 as shown. As illustrated in cross section in Fig. 4, the lower portion of the duct section may be provided with a relatively short extension 108 beyond the bottom flange 104, the extension being slightly tapered as shown for facilitating alignment with the opening in the duct to which it is attached. As also shown in Fig. 4, each bearing portion 106 may be provided with vertical extensions comprising ears 110 provided with openings for accommodating the external damper operating controls.

While the preferred embodiment of the invention has been herein illustrated and described, it will be understood that the invention may be embodied in other forms within the scope of the following claims.

Having thus described the invention, what is claimed is:

1. A connecting duct for use in connecting an air discharge outlet to an air supply duct comprising an elongated hollow duct section provided with upper and lower outwardly extended flanges at the top and bottom of the section, said connecting duct being made in two identical longitudinally extended half sections, each half section being provided with outwardly projecting seam flanges along their longitudinal marginal edges and joined in face-to-face engagement with the seam flange of its corresponding half section, said seam flanges being coextensive with said top and bottom flanges, said projecting seam flanges each having a short hollow semicylindrical shaped bearing forming portion integral therewith and cooperating with the semicylindrical portion of its corresponding half section to form cylindrical bearing portions in opposed walls disposed in alignment one with the other for a damper operating shaft extended therethrough.

2. A connecting duct unit as defined in claim 1 wherein the upper end of each half section is provided with a longitudinal groove extending across a flange at one end and terminating at the inner edge of the opposing flange providing in the assembled duct unit a slide opening adapted to receive a manually operated slide damper.

3. A connecting duct for use in connecting an air discharge outlet to an air supply duct comprising an elongated hollow unitary duct section provided with upper and lower outwardly extended flanges at the top and bottom of the section, two opposed side walls of the unitary duct section being each provided with two spaced short outwardly extended hollow cylindrical portions of uniform cross section and integral therewith, each being aligned with a corresponding portion in the opposed side wall, each pair of aligned portions forming bearings for a damper operating shaft extended therethrough, each of said cylindrical portions having a vertically extended ear provided with openings adapted to accommodate external damper operating controls.

4. A connecting duct as defined in claim 3 wherein the lower end of the hollow duct section is provided with a relatively short extension integral with the bottom flange and having a downwardly tapering outer surface to serve as a guide for facilitating alignment with an opening in a cooperating duct section.

References Cited in the file of this patent

UNITED STATES PATENTS

| | | |
|---|---|---|
| 169,777 | Culp | Nov. 9, 1875 |
| 272,764 | Peters | Feb. 20, 1883 |
| 755,973 | West | Mar. 29, 1904 |
| 1,436,649 | Clark | Nov. 28, 1922 |
| 2,131,804 | Holub | Oct. 4, 1938 |
| 2,217,479 | Guyer | Oct. 8, 1940 |
| 2,285,829 | Maage | June 9, 1942 |
| 2,347,936 | Crewson | May 2, 1944 |
| 2,509,782 | Person | May 30, 1950 |
| 2,699,106 | Hoyer | Jan. 11, 1955 |
| 2,734,446 | O'Day | Feb. 14, 1956 |

FOREIGN PATENTS

| | | |
|---|---|---|
| 16,654 | Great Britain | July 16, 1909 |
| 527,631 | Great Britain | Oct. 14, 1940 |
| 635,256 | Great Britain | Apr. 5, 1950 |